United States Patent
Schnagl

(10) Patent No.: US 7,036,323 B2
(45) Date of Patent: May 2, 2006

(54) CRYOGENIC TANK FOR STORING CRYOGENIC FUEL IN A MOTOR VEHICLE AND METHOD FOR USING SAME

(75) Inventor: Johann Schnagl, Neuried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 132 days.

(21) Appl. No.: 10/781,648

(22) Filed: Feb. 20, 2004

(65) Prior Publication Data

US 2004/0250551 A1   Dec. 16, 2004

Related U.S. Application Data

(63) Continuation of application No. PCT/EP02/08445, filed on Jul. 30, 2002.

(30) Foreign Application Priority Data

Aug. 22, 2001  (DE) ................ 101 41 048

(51) Int. Cl.
*F17C 13/08* (2006.01)
*F17C 1/00* (2006.01)
*F17C 13/00* (2006.01)
*F28F 27/00* (2006.01)

(52) U.S. Cl. .................. 62/45.1; 62/53.2; 165/96; 165/277; 220/560.1

(58) Field of Classification Search ............. 62/45.1, 62/53.2; 220/560.04, 560.11, 560.1, 560.12; 565/96, 277
See application file for complete search history.

(56) References Cited

U.S. PATENT DOCUMENTS

| | | | | |
|---|---|---|---|---|
| 2,830,444 A | * | 4/1958 | Morrison | 62/7 |
| 3,006,611 A | * | 10/1961 | Isham | 165/86 |
| 3,130,561 A | * | 4/1964 | Hnilicka, Jr. | 62/331 |
| 3,721,101 A | * | 3/1973 | Sheppard et al. | 62/56 |
| 4,546,613 A | * | 10/1985 | Eacobacci et al. | 62/55.5 |
| 5,613,366 A | * | 3/1997 | Schoenman | 62/45.1 |
| 5,828,280 A | * | 10/1998 | Spivey et al. | 335/216 |
| 5,960,868 A | * | 10/1999 | Kuriyama et al. | 165/135 |

FOREIGN PATENT DOCUMENTS

| | | | |
|---|---|---|---|
| DE | 42 12 625 A | | 10/1993 |
| DE | 42 12 626 A | | 10/1993 |
| DE | 195 46 619 A | | 6/1997 |

(Continued)

OTHER PUBLICATIONS

International Search Report in PCT/EP02/08445 Nov. 20, 2002.

*Primary Examiner*—William C. Doerrler
(74) *Attorney, Agent, or Firm*—Crowell & Moring LLP

(57) ABSTRACT

A tank for storing a cryo fuel in a vehicle with an internal storage container, an external container enveloping the internal container, and an electromagnetically switch selectable thermal bridge element which can produce or interrupt a heat conducting connection between the wall of the internal container and the wall of the external container. The thermal bridge element may be designed such that in the closed state a spatial contact area is formed between a receiving element of the thermal switch affixed to the internal container and an output element of the thermal switch affixed to the outer container. The receiving element may have a smaller thermal capacity and/or size than the output element. Either the thermal bridge or a second thermal bridge element may be adapted to cool the internal container.

34 Claims, 1 Drawing Sheet

FOREIGN PATENT DOCUMENTS

| | | |
|---|---|---|
| DE | 19544593 | 6/1997 |
| DE | 19546618 | 7/1997 |
| EP | 0715119 | 6/1996 |
| WO | WO 85 00419 A | 1/1985 |

\* cited by examiner

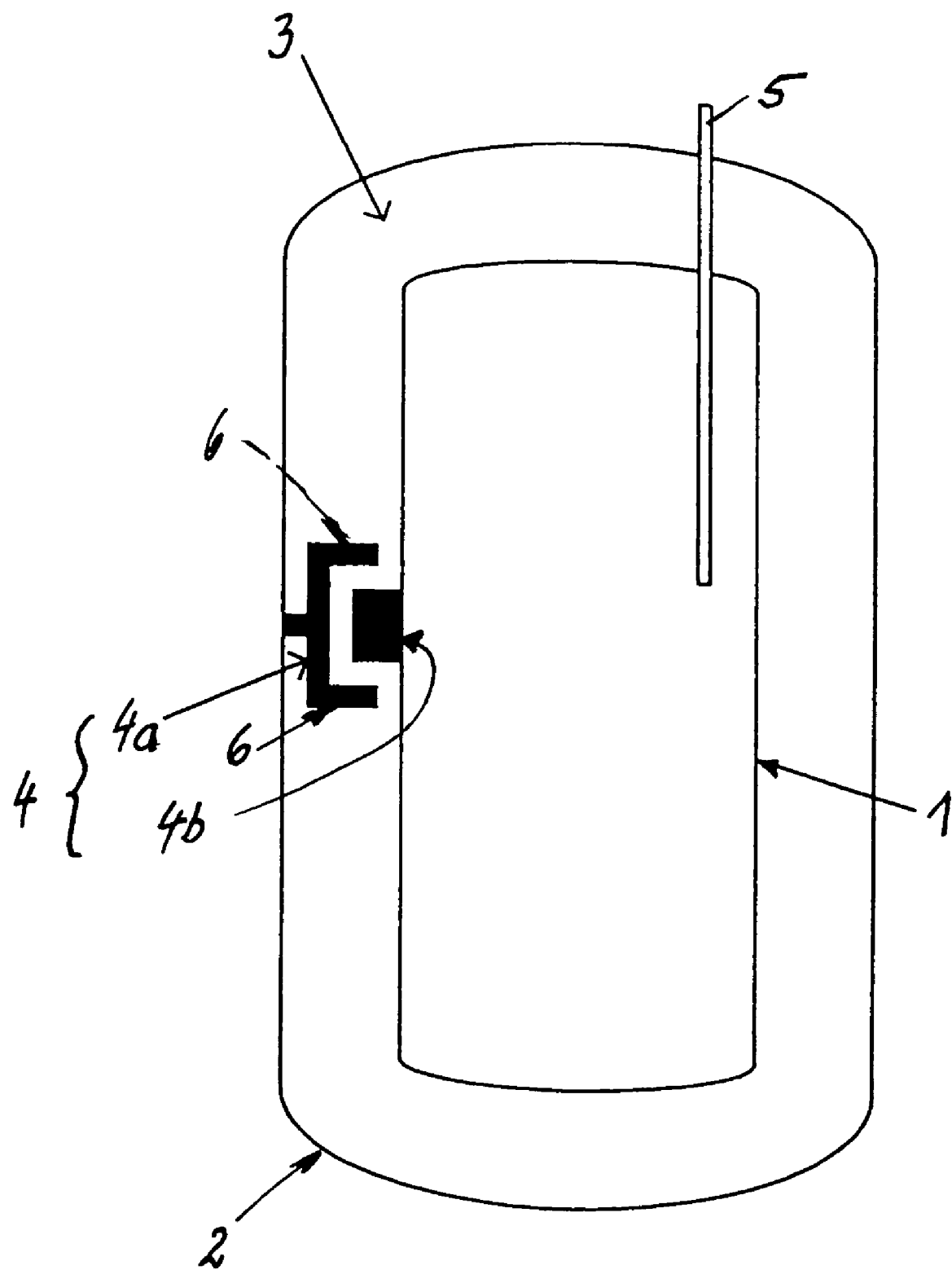

CRYOGENIC TANK FOR STORING CRYOGENIC FUEL IN A MOTOR VEHICLE AND METHOD FOR USING SAME

The present application is a continuation of International Patent Application No. PCT/EP02/08445, filed Jul. 30, 2002, designating the United States of America and published in German as WO 03/018344 A1, the entire disclosure of which is incorporated herein by reference. Priority is claimed based on Federal Republic of Germany patent document DE 101 41 048.4 filed Aug. 22, 2001.

BACKGROUND AND SUMMARY OF THE INVENTION

The invention relates to a vehicle cryo tank for storing a cryo fuel in a motor vehicle, comprising an internal storage container and an external container, enveloping said internal container, so as to form an insulating vacuum, whereby heat input from the outside into or at the internal container can be switched on or off. The invention further relates to a method for using the same. For the technical environment reference is made to DE 195 46 618 C2 as an example.

Searching for alternative drive energies for motor vehicles, one is also working with liquefied gases in general and with hydrogen in particular. In this respect a liquefied gas (for example, liquefied natural gas) or hydrogen in the liquid form is stored in a so-called cryo tank. Different lines, in which there are, for example, valves, but also heat exchangers or elements of the tank system that generally convey fluid, lead into the tank or out of the tank, thus, among other things, to the fuel operated internal combustion engine.

Fuel, which is gaseous under normal ambient conditions, is stored in a highly cooled state in a container, which is called here an internal container, of a cryo tank that is enveloped by a container, which is called here an external container, to minimize thermal input. In this case the space between the internal container and the external container is largely evacuated. On the other hand, a targeted thermal input into the interior of the internal storage container is necessary and thus into the fuel stored therein, because the tank is always supposed to have an adequate quantity of gaseous fuel, after the fuel is fed in the gaseous state to the internal combustion engine.

In the known prior art, the desired thermal input into the internal container occurs by means of an electrically operated heating element, which is disposed inside said internal container. To supply the heating element with energy, lines must be run into and out of the cryo tank. The same also applies to another method of targeted thermal input, where already gaseous fuel is guided through the still fluid fuel. Here, too, for the targeted introduction of the gaseous fuel, at least one separate pipe line with switching valves and/or the like is necessary.

Even if in these known systems no heat input is supposed to occur in the internal storage container, the said lines act as an already existing thermal bridge, over which a small, but not ignorable quantity of heat can get to the stored fuel, a state that is fundamentally undesired. Another drawback of these known systems lies in their hysteresis behavior, in particular when turning off. That is, after the targeted thermal input is turned off, heat is fed on a significant scale in an undesired manner to the stored fuel for a certain period of time.

The object of the present invention is to provide a measure to remedy this described problem.

The solution to this problem is characterized in that there is a switch selectable thermal bridge element, over which a heat conducting connection between the wall of the internal container as well as the wall of the external container can be produced or interrupted. Further advantageous designs and improvements are discussed below.

According to the invention, a special element is provided virtually between the internal container and the external container and thus in the insulating vacuum, with which this insulating vacuum can be bridged so as to be switch selectable. This so-called thermal bridge element can be changed over and can thus be moved from a so-called closed position, in which it produces a heat conducting connection between the wall of the internal container and the wall of the external container, into an opened position, in which this connection is interrupted and thus the insulating vacuum is not bridged. Like a plug-socket connection or an electric switch or the like, the thermal bridge element can exhibit a so-called receiving element, fastened to the outside of the wall of the internal container, as well as a so-called output element, fastened to the inside of the wall of the external container. Of these two elements at least one can be moved relative to the other.

As long as the receiving element and the output element are separated from each other and thus are not connected together so as to conduct or transfer heat, there is certainly no thermal input of virtually any kind (with the exception of thermal radiation) over this thermal bridge element into the cryo tank or any supply of heat to the fuel stored therein. In particular, then heat cannot be supplied over lines, which are, in fact, blocked, but, nevertheless, lead into the storage space of the internal container, to the fuel therein. The aforementioned continuous heat input, which may in deed be low, but still not ignorable, into the cryo tank over special lines, provided specifically to supply heat to the cryo tank, cannot take place, if such a targeted supply of heat is not desired. Not until and only as long as this thermal bridge element is closed, does such a targeted heat input into the system occur, as desired. If thereafter the thermal bridge element is opened, the supply of heat is stopped almost suddenly, in particular if the receiving element, assigned to the internal container, has a relatively low thermal capacity. In this sense the so-called receiving element of the internal container can have a lower thermal capacity and/or a smaller size than the output element, assigned to the external container.

Like a relay, the switch selectable thermal bridge element can be changed over electromagnetically. A related electric line to supply the switch selectable electromagnet has to lead only to the so-called output element, which is provided on the external container, but not to the so-called receiving element, which is provided on the internal container, so that the desired effect, namely no thermal bridge in the form of a continuous electric line, is still guaranteed.

Whereas in the opened state of this thermal bridge element, there is, as desired, no heat input of any kind into the system or into the fuel stored therein, when the thermal bridge element is closed, an optimal supply of heat to the cryo fuel stored in the internal container is desired. To achieve this state, the switch selectable thermal bridge element can be designed in such a manner that in the closed state a spatial (and not just linear) contact area or the heat transfer area is formed between the receiving element and the output element of the switch selectable thermal bridge element. For example, in the so-called closed state of the thermal bridge element a conical pin or the like of the output element can project into a corresponding receptacle of the receiving element and in so doing come to lie as completely as possible against the corresponding receiving wall.

Similarly with respect to an optimized heat transfer between the output element and the receiving element at least one of these elements can be designed in such a manner so as to be flexible or variable in shape that in the closed state of the thermal bridge element adequate heat transfer is guaranteed. In so doing in the closed state these two elements are pressed against each other. For example, the output element can vary in shape so that in the closed state of the thermal bridge element it clamps the receiving element between itself.

Other objects, advantages and novel features of the present invention will become apparent from the following detailed description of the invention when considered in conjunction with the accompanying drawing.

BRIEF DESCRIPTION OF THE DRAWINGS

FIG. 1 is a is a cross-sectional view of a cryo tank in a motor vehicle in accordance with an embodiment of the invention.

DETAILED DESCRIPTION

The reference numeral 1 refers to the internal container of a motor vehicle cryo tank, in which is mostly stored cryo fuel in the liquid state, to supply an internal combustion engine or the like that drives the motor vehicle. This internal container 1 is enveloped by an external container 2, which is spaced apart from said internal container, so that the space 3 between these two containers 1, 2 is largely evacuated. That is, between the wall of the internal container 1 and the wall of the external container 2 there is a so-called insulating vacuum (for this purpose the reference numeral 3 is also used).

A fuel line 5 is run into the interior of the internal container 1 or out of said internal container through the wall of the external container 2 to the outside; through said fuel line the cryo fuel is conveyed into the internal container 1 or the fuel can be removed from said internal container to supply the said internal combustion engine. The latter occurs with fuel that has already assumed the gaseous aggregate state. To have always available an adequate supply of gaseous fuel in the interior of the internal container 1, a quantity of heat can be conveyed into or transferred selectively in a suitable manner to the internal container 1.

For this heat input, which is supposed to occur only as desired and be specifically controllable, there is a so-called switch selectable thermal bridge element, all of which is labeled with the reference numeral 4, in the insulating vacuum space 3. This thermal bridge element comprises a so-called output element 4a, which is disposed preferably on the inside, facing the internal container 1, of the wall of the external container 2, as well as a so-called receiving element 4b, which is attached preferably to the outside, facing the external container 2, of the wall of the internal container 1.

In the state illustrated in the figure, the output element 4a and the receiving element 4b are not connected together so as to conduct heat so that owing to the insulating vacuum 3 in this area, no heat can be transferred between these two elements 4a, 4b. However, the so-called thermal bridge element 4, which is formed by means of these elements 4a, 4b, can be changed over, so that its two elements 4a, 4b can be moved into a relative position, in which it is possible for heat to transfer between these elements 4a, 4b. If then these elements 4a, 4b are connected together so as to conduct heat, the so-called thermal bridge element 4 is closed, whereas in the state illustrated in the figure it is in its opened position.

Just a simple heat conducting connection between the wall of the external container 2 and the wall of the internal container 1 ensures that heat is transferred from the external container 2, which has a significantly higher temperature than the internal container 1, to the internal container 1. Since, viewed in reverse, in the closed state, which is relatively short in time, of the thermal bridge element 4, a sizeable quantity of coldness is released from the internal container 1 to the external container 2, it can be meaningful, for example, to attached a suitable heat exchanger (not shown in the figure) to the output element 4a or to its port provided on the outside of the external container 1, in order to prevent the external container 1 from icing.

Thus, heat can be supplied to the output element 4a, which is attached to the inside of the external container 2, by means of the said heat exchanger or in a different manner that is not shown, through the wall of this external container 2. As long as the thermal bridge element 4 is open, this (quantity of) heat is not conducted any further due to the insulating vacuum 3. If, however, the thermal bridge element 4 is closed, then the (quantity of) heat, applied at the output element 4a, is conducted to the receiving element 4b, which then releases this quantity of heat to the outside wall 1a of the internal container 1. Then this quantity of heat is supplied by means of the wall of the internal container 1 to the cryo fuel stored in the internal container 1.

The switch selectable thermal bridge element 4 is not shown here in detail, because design variants of all kinds are possible. For example, moveable so-called jaws of the output element 4a, referenced with an arrow 6 in the attached figure, can be shifted in such a manner that in the closed state of the thermal bridge element 4, it clamps the receiving element 4b between itself. Thus, good heat transfer with a relatively large heat transfer area is guaranteed.

Also not shown in the figure are additional measures for increasing the efficiency of the vehicle cryo tank system depicted here. Thus, special measures for increasing the transfer of heat between the receiving element 4b and a larger section of the outside wall 1a of the internal container 1 can be provided in order to increase the heat transfer between the receiving element 4b and the internal container 1. In this sense the internal container 1 can be coated internally or externally at a minimum in the vicinity of the receiving element 4b with a copper foil or another highly heat conductive material. Furthermore, measures for increasing the heat transfer between the receiving element 4b and the interior of the internal container 1 can be provided. In this context the receiving element 4b can extend inwardly through the wall of the internal container 1 into the cryo fuel and in so doing can be suitably shaped or formed with respect to good heat input.

It is especially advantageous that not only specifically heat can be released from the outside to the internal container 1 or fuel stored therein by means of the proposed thermal bridge element 4, but that this or another comparably designed thermal bridge element can be provided additionally for cooling the internal container. Especially before a filling process of the cryo tank, its internal container 1 can be precooled in an advantageous manner, if coldness is applied in a suitable manner to the output element 4a on the external container 2, that is, when the output element 4a is highly cooled.

With respect to the arrangement of the switch selectable thermal bridge element 4 in the insulating vacuum space 3 between the wall 1a of the internal container 1 and the wall 2a of the external container 2, this thermal bridge element 4 can be disposed, for example, on a brace or the like, by means of which the internal container 1 is braced against the external container 2, whereby this brace itself is designed—as typical—in such a manner that it exercises only a minimal thermal bridge function. That is, it itself is as little heat conductive as possible, but it as well as a plurality of other details exhibiting a special construction can be designed, of course, so as to deviate from the illustrated embodiment without abandoning the content of the patent claims. With a switch selectable thermal bridge element 4 of the invention, a quantity of heat can always be fed, if necessary, that is in the closed state, from the outside into the cryo tank, whereas in the open state of this thermal bridge element 4 no additional thermal bridge is formed so that then any heat input over this thermal bridge element 4 is stopped.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle cryo tank for storing a cryo fuel in a motor vehicle, comprising:
    an internal storage container and an external container enveloping said internal container so as to form an insulating vacuum, said containers arranged in fixed positions relative to one another, whereby heat input from the outside into or at the internal container can be switched on or off, wherein there is a switch selectable thermal bridge element, over which a heat conducting connection between the wall of the internal container and the wall of the external container can be produced or interrupted.

2. Vehicle cryo tank, as claimed in claim 1, wherein the thermal bridge element includes a receiving element, which is fastened to the outside of the wall of the internal container, as well as an output element, fastened to the inside of the wall of the external container, and at least one of the receiving element and the output element can be moved relative to the other.

3. Vehicle cryo tank, as claimed in claim 2,
    wherein the switch selectable thermal bridge element can be changed over electromagnetically.

4. Vehicle cryo tank, as claimed in claim 3,
    wherein the switch selectable thermal bridge element is designed in such a manner that in the closed state a spatial contact area for heat transfer is formed between the receiving element and the output element.

5. Vehicle cryo tank, as claimed in claim 2,
    wherein the receiving element has one of a smaller thermal capacity and a smaller size than the output element.

6. Vehicle cryo tank, as claimed in claim 2,
    wherein a heat exchanger is provided on the output element.

7. Vehicle cryo tank, as claimed in claim 2,
    wherein at least one of the output element and the receiving element are designed so as to be variable in shape in such a manner that in the closed state of the thermal bridge element a desired transfer of heat is obtained.

8. Vehicle cryo tank, as claimed in claim 2,
    wherein the shape of the output element can be changed in such a manner that in the closed state of the thermal bridge element the receiving element is clamped between the output element.

9. Vehicle cryo tank, as claimed in claim 2, further comprising:
    measures for increasing the heat transfer between the receiving element and a section of the wall of the internal container.

10. Vehicle cryo tank, as claimed in claim 9, further comprising:
    measures for increasing the heat transfer between the receiving element and the interior of the internal container.

11. Vehicle cryo tank, as claimed in claim 2,
    wherein the thermal bridge element is adapted to cool the internal container.

12. Vehicle cryo tank, as claimed in claim 2, further comprising:
    a second thermal bridge element adapted to cool the internal container.

13. Vehicle cryo tank, as claimed in claim 1, wherein the switch selectable thermal bridge element can be changed over electromagnetically.

14. A tank for storing a cryo fuel in a motor vehicle, comprising:
    an internal storage container;
    an external container enveloping said internal container, an insulating vacuum formed therebetween, said containers arranged in fixed positions relative to one another; and
    a switch selectable thermal bridge element which forms an interruptable heat conducting connection between the internal container and the external container.

15. The tank of claim 14, wherein the thermal bridge element includes a receiving element affixed to the internal container and an output element affixed to the external container, and at least one of the receiving element and the output element can be moved relative to the other.

16. The vehicle cryo tank of claim 15, wherein
    the switch selectable thermal bridge element can be switched electromagnetically.

17. The vehicle cryo tank of claim 16, wherein
    when the switch selectable thermal bridge element is in the closed state a spatial contact area for heat transfer is formed between the receiving element and the output element.

18. The vehicle cryo tank of claim 15, wherein
    the receiving element has one of a smaller thermal capacity and a smaller size than the output element.

19. The vehicle cryo tank of claim 15, further comprising:
    a heat exchanger disposed on the output element.

20. The vehicle cryo tank of claim 15, wherein
    at least one of the output element and the receiving element is variable in shape such that when the thermal bridge is in the closed state a desired amount of heat transfer is obtained.

21. The vehicle cryo tank of claim 15, wherein
    when the thermal bridge is in the closed state, the receiving element is captured by the output element.

22. The vehicle cryo tank of claim 15, further comprising:
    at least one heat transfer enhancing element between the receiving element and the internal container.

23. The vehicle cryo tank of claim 22, wherein
    the at least one heat transfer enhancing element increases heat transfer between the receiving element and the interior of the internal container.

24. The vehicle cryo tank of claim 15, wherein the thermal bridge element is adapted to cool the internal container.

25. Vehicle cryo tank, as claimed in claim 15, further comprising:
a second thermal bridge element adapted to cool the internal container.

26. A thermal bridge element for controlling heat transfer within a tank for storing a cryo fuel in a motor vehicle, comprising:
a receiving element adapted to be affixed to an exterior surface of an internal container of the tank; and
an output element adapted to be affixed to an interior surface of an external container enveloping said internal container,
wherein, when located in the tank, at least one of the receiving element and the output element can be moved relative to the other without movement of the containers relative to one another, such that the thermal bridge element forms a switch-selectable interruptable heat conducting connection between the internal container and the external container.

27. The thermal bridge element of claim 26, wherein the switch selectable thermal bridge element can be switched electromagnetically.

28. The thermal bridge element of claim 27, wherein when the switch selectable thermal bridge element is in the closed state a spatial contact area for heat transfer is formed between the receiving element and the output element.

29. The thermal bridge element of claim 26, wherein the receiving element has one of a smaller thermal capacity and a smaller size than the output element.

30. The thermal bridge element of claim 26, further comprising:
a heat exchanger disposed on the output element.

31. The thermal bridge element of claim 26, wherein when the thermal bridge is in a closed state, the receiving element is captured by the output element.

32. A method for controlling heat transfer within a tank for storing a cryo fuel in a motor vehicle, wherein the tank includes an internal storage container, an external container enveloping said internal container, said containers arranged in fixed positions relative to one another, an insulating vacuum formed therebetween, and a switch-selectable thermal bridge element which forms an interruptable heat conducting connection between the internal container and the external container, comprising the act of:
switching the thermal bridge element between a closed position and an open position to obtain a desired amount of heat transfer between the inner container and the outer container.

33. The method of claim 32, wherein the thermal bridge element includes a receiving element affixed to the internal container and an output element affixed to the external container, and at least one of the receiving element and the output element can be moved relative to the other.

34. The method of claim 33, wherein the act of switching the thermal bridge element is controlled by a thermal bridge element switching controller.

* * * * *